United States Patent
Wlassics et al.

[11] Patent Number: 5,656,697
[45] Date of Patent: Aug. 12, 1997

[54] CURABLE COMPOSITIONS OF FLUOROELASTOMERS CONTAINING BROMINE

[75] Inventors: Ivan Wlassics, Genova; Enzo Giannetti, Novara, both of Italy

[73] Assignee: Ausimont S.p.A., Italy

[21] Appl. No.: 691,379

[22] Filed: Aug. 2, 1996

[30] Foreign Application Priority Data

Aug. 4, 1995 [IT] Italy .................. MI95A1741

[51] Int. Cl.$^6$ .................. C08F 8/00
[52] U.S. Cl. .................. 525/326.3
[58] Field of Search .................. 525/326.3

[56] References Cited

U.S. PATENT DOCUMENTS

| | | | |
|---|---|---|---|
| 4,214,060 | 7/1980 | Apotheker et al. | 525/387 |
| 4,243,770 | 1/1981 | Tatemoto et al. | 525/331 |
| 4,251,399 | 2/1981 | Tomoda et al. | 280/4 R |
| 4,413,094 | 11/1983 | Aufdermarsh, Jr. | 525/187 |
| 4,501,869 | 2/1985 | Tatemoto et al. | 526/249 |
| 4,613,636 | 9/1986 | Oakaar | 524/83 |
| 4,745,165 | 5/1988 | Arcella et al. | 526/247 |
| 4,831,085 | 5/1989 | Okabe et al. | 525/387 |
| 5,153,272 | 10/1992 | Chiodini et al. | 525/345 |
| 5,378,782 | 1/1995 | Grootaert | 526/285 |

FOREIGN PATENT DOCUMENTS 410351 1/1991 European Pat. Off. .
93/22379 11/1993 WIPO .

OTHER PUBLICATIONS

European Search Report dated Dec. 17, 1996.
"Ullmann's Encyclopedia of Industrial Chemistry" vol. A–11, pp. 417–429 VCH, Verlagsgesellschaft, 1988.
J. Am. Chemical Society, 116, 1994, pp. 4521–4522.

*Primary Examiner*—Edward J. Cain

[57] ABSTRACT

Peroxide-curable fluoroelastomeric compositions, consisting of a fluoroelastomer containing bromine, an organic peroxide and a metal-organic hydride having the formula:

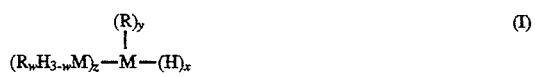

wherein M is selected from Sn, Si, Ge, Pb; x is an integer from 1 to 3; y, z are zero or integers from 1 to 3, with the proviso y+z=4−x; w is an integer from 1 to 3; the R groups, equal to or different from each other, are selected from: alkyls $C_1$–$C_4$, aryls $C_6$–$C_{12}$, arylalkyls and alkylaryls $C_7$–$C_{14}$, optionally containing nitrile and/or hydroxyl groups. The hydride addition allows to increase the curing rate, obtaining at the same time a high crosslinking degree.

13 Claims, No Drawings

CURABLE COMPOSITIONS OF FLUOROELASTOMERS CONTAINING BROMINE

FIELD OF THE INVENTION

The present invention relates to fluoroelastomers curable compositions. More particularly the present invention relates to curable compositions of fluoroelastomers containing bromine.

BACKGROUND OF THE INVENTION

Various types of fluoroelastomers are known in the art, which are widely used in all those fields where optimal elastic properties associated with high chemical and thermal stability are required. For a broad treatment of such products see for instance "Ullmann's Encyclopedia of Industrial Chemistry", vol. A-11, pag. 417–429 (1988, VCH Verlagsgesellschaft). They are copolymers based on vinylidene fluoride (VDF) and/or on tetrafluoroethylene (TFE), wherein such monomers are copolymerized with other fluorinated ethylenically unsaturated monomers, such as hexafluoropropene (HFP), perfluoroalkylvinylethers (PAVE), chlorotrifluoroethylene (CTFE) and the like, or also with non fluorinated monomers having ethylene unsaturation, such as ethylene and propylene.

The fluoroelastomers can be ionically cured by addition of suitable curing agents (for instance polyhydroxylic compounds, such as Bisphenol AF or Bisphenol A), of accelerators (for instance ammonium, phosphonium, or aminophosphonium salts), and of bivalent metals oxides and/or hydroxides (for instance MgO, Ca(OH)$_2$).

Peroxide-curable fluoroelastomers have been developed more recently, which contain iodine and/or bromine atoms along the polymeric chain and/or in terminal position. Such iodine and/or bromine atoms can be introduced by suitable iodinated and/or brominated comonomers, or by using during the polymer preparation iodinated and/or brominated chain transfer agents (see for instance U.S. Pat. Nos. 4,243,770, 4,501,869 and 4,745,165). In the presence of free radicals, coming for instance from a peroxide, the iodine and/or bromine atoms act as cure-sites owing to the homolytic scission of the carbon-halogen bonds.

Since the homolytic scission of C—I bonds is much faster than that of C—Br bonds, the fluoroelastomers containing iodine show much higher curing rates than those of the brominated products. On the other hand the greatest transience of the C—I bonds involves problems in the use and in the conservation of the iodinated fluoroealastomers, mainly due to their poor stability to light. Moreover, it is known that toxic volatile by products, in particular CH$_3$I, are generated during curing, whose cancerogenous potential is notoriously much higher than that of CH$_3$Br.

DESCRIPTION OF THE INVENTION

The Applicant has now surprisingly found that the curing rate of the fluoroelastomers containing bromine can be considerably increased by adding to the curing blend a metallorganic compound hydride as hereinafter defined, obtaining at the same time a high crosslinking degree.

Object of the present invention is therefore a curable fluoroelastomeric composition, comprising:

(a) a fluoroelastomer containing bromine;

(b) an organic peroxide, in amounts comprised between 0.1 and 10%, preferably between 1 and 5% by weight with respect to the fluoroelastomer;

(c) a metallorganic hydride having the formula:

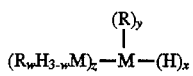

wherein M is selected from Sn, Si, Ge, Pb; x is an integer from 1 to 3; y, z are zero or integers from 1 to 3, with the proviso y+z=4−x; w is an integer from 1 to 3; the R groups, equal to or different from each other, are selected from: alkyls C$_1$–C$_4$, aryls C$_6$–C$_{12}$, arylalkyls and alkylaryls C$_7$–C$_{14}$, optionally containing nitrile and/or hydroxyl groups; in amounts comprised between 0.2 and 10%, preferably between 0.5 to 2% by weight with respect to the fluoroelastomer.

A further object of the present inention consists in a process for the curing of a composition based on a fluoroelastomer containing bromine, which comprises the addition to the composition of an organic peroxide and of an hydride of formula (I) as defined above, in amounts corresponding to the values indicated above, and subsequently the heating of the composition at such a temperature as to cause the decomposition of the peroxide.

The hydrides of formula (I) are known compounds (see for instance J. Am. Chem Soc., 116 (1994), page 4521–4522). Particularly preferred are those wherein x=1 and w=3, for instance: tri(n-butyl)-tin-hydride, tri(ethyl) silyl-hydride, di(trimethylsilyl)-silylmethyl-hydride, tri(trimethylsilyl)-silylhydride, and the like, or mixtures thereof.

The fluoroelastomers containing bromine are as well known products. They contain bromine in amounts generally comprised between 0.001 and 5%, preferably between 0.01 and 2.5%, by weight with respect to the total weight of the polymer. The bromine atoms can be present along the chain and/or in terminal position.

In order to introduce bromine atoms along the chain, the copolymerization of the basic monomers of the fluoroelastomer is carried out with a suitable bromine-containing fluorinated comonomer (cure-site monomer) (see for instance U.S. Pat. Nos. 4,745,165, 4,831,085, and 4,214,060). Such comonomer can be selected for instance from:

(a) bromo(per)fluoroalkyl-perfluorovinylethers having the formula:

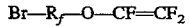

wherein R$_f$ is a (per)fluoroalkylene C$_1$–C$_{12}$, optionally containing chlorine and/or ether oxygen atoms; for instance: BrCF$_2$—O—CF=CF$_2$, BrCF$_2$CF$_2$—O—CF=CF$_2$, BrCF$_2$CF$_2$CF$_2$—O—CF=CF$_2$, CF$_3$CFBrCF$_2$—O—CF=CF$_2$, and the like;

(b) bromo-(per)fluoroolefins having the formula:

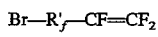

wherein R'$_f$ is a (per)fluoroalkylene C$_1$–C$_{12}$, optionally containing chlorine atoms; for instance: bromotrifluoroethylene, 1-bromo-2,2-difluoroethylene, bromo-3,3,4,4-tetrafluorobutene-1, 4-bromo-perfluorobutene-1, and the like.

The units of brominated comonomer in the final polymer are present in amounts generally comprised between 0.01 and 3% by moles, preferably between 0.1 and 1% by moles.

In replacement of or in addition to the brominated comonomer, the fluoroelastomer can contain bromine atoms in terminal position, deriving from a suitable brominated chain transfer agent introduced in the reation medium during the polymer preparation, as described in U.S. Pat. No. 4,501,869.

Such transfer agents have the formula $R_fBr_x$, wherein $R_f$ is a x-valent (per)fluoroalkylic radical $C_1$–$C_{12}$, optionally containing chlorine atoms, while x is 1 or 2. They can be selected for instance from: $CF_2Br_2$, $Br(CF_2)_2Br$, $Br(CF_2)_4Br$, $CF_2ClBr$, $CF_3CFBrCF_2Br$, and the like. The amount of bromine in terminal position is generally comprised between 0.001 and 3%, preferably between 0.01 and 1%, by weight with respect to the fluoroelastomer weight.

The basic monomeric structure of the fluoroelastomers containing bromine generally comprises from 20 to 85% by moles of VDF and/or TFE, copolymerized with at least another fluorinated ethylenically unsaturated monomer, selected for instance from: perfluoroolefins $C_3$–$C_8$, such as hexafluoropropene (HFP), perfluorobutene; fluoroolefins $C_2$–$C_8$ containing hydrogen and/or chlorine, such as trifluoroethylene, pentafluoropropene, chlorotrifluoroethylene (CTFE); (per)fluoroalkylvinylethers (PAVE) $CF_2=CFOR_f$, wherein $R_f$ is a (per)fluoroalkyl $C_1$–$C_6$, for instance trifluoromethyl, pentafluoropropyl; perfluorooxyalkylvinylethers $CF_2=CFOX$, wherein X is a perfluorooxyalkyl $C_1$–$C_{12}$ having one or more ether groups, for instance, perfluoro-2-propoxy-propyl. Units deriving from non fluorinated ethylenically unsaturated monomers, in particular non fluorinated olefins $C_2$–$C_8$, such as ethylene and propylene, can be also present. The curable compositions object of the present invention comprise an organic peroxide. The organic peroxide must be capable of generating free radicals owing to heating or in presence of redox systems. It can be for instance selected from: 2,5-dimethyl-2,5-di (terbutylperoxy)hexane, 2,5-dimethyl-2,5-di (terbutylperoxy)hexino-3, dicumylperoxide, dibenzoylperoxide, diterbutylperbenzoate, diterbutylperoxide, di[1,3-dimethyl-3-(terbutylperoxy) butyl]-carbonate, and the like. Other usable organic peroxides are described in U.S. Pat. No. 5,153,272.

Also polyunsaturated compounds acting as curing co-agents are usually added to the peroxide-curable compositions in amounts generally comprised between 0.1 and 10%, preferably between 0.5 and 5%, by weight with respect to the fluoroelastomer. They can be selected for instance from: triallyl-cyanurate (TAC), triallyl-isocyanurate (TAIC), triallyl-trimellitate, tris(diallylamino)-s-triazine, triallyl-phosphite, N,N-diallyl-acrylamide, hexaallylphosphoramide, N,N'-m-phenylene-bismaleimide, diallylphthalate, tri(5-norbornene-2-methylene)-cyanurate, and the like.

Oxides and/or hydroxides of divalent metals, for instance, Ca, Mg, Pb, or Zn, optionally in association with a salt of a weak acid are usually added to the blend, before curing, in amounts generally comprised between 1 and 15% by weight, preferably between 2 and 10% by weight, with respect to the fluoroelastomer.

The compositions object of the present invention can moreover contain other conventional additives, such as pigments, stabilizers, antioxidants, thickeners, reinforcing agents, plastifiers, processing aids, etc. Additives of inorganic types are for instance: carbon black, silica, titanium oxide, talc, barium sulphate, and the like. Fibers of polymers containing fluorine, such as polytetrafluoroethylene, polyvinylidene fluoride, polychlorotrifluoroethylene, tetrafluoroethylene/ethylene copolymers, and the like can be used as reinforcing agents.

The various components of the compositions object of the present invention can be mixed each other and homogenized according to conventional techniques, such as roll mixing, kneader mixing, Banbury mixing, and the like. The subsequent processing and molding steps can be carried out, as well, according to known techniques, such as calendering, extrusion, compression or injection molding, etc.

The compositions object of the present invention can be cured by simple heating at such a temperature as to cause the decomposition of the organic peroxide, for instance from 100° to 250° C. for a time of about 1–120 min. Subsequently the cured articles can be optionally submitted to post-curing processes, so as to eliminate water and other volatile by-products and to stabilize the mechanical and elastic properties, for instance by heating in press at about 150°–300° C. for 6–30 hours.

The present invention will be better illustrated now by the following working examples, whose purpose is merely indicative but not limitative of the scope of the invention.

EXAMPLE 1

A rubber Tecnoflon® P2 (53% moles of VDF, 23% moles HFP, 24% moles TFE), containing 0.59% by weight of bromine deriving from the introduction of 2-bromo-perfluoroethyl-perfluorovinylether (BVE) as a comonomer, having number average molecular weight equal to 64,000 and weight average molecular weight equal to 250,000, was used for the preparation of the compositions.

To 100 g of such rubber were added:

3 phr (1 phr=1 g of substance for 100 g of rubber) of peroxide Luperco® 101 XL (2,5-dimethyl-2,5-di (terbutylperoxy)hexane);

4 phr of triallyl-isocyanurate (TAIC);

0.536 phr of tri-n-butyl-tin hydride $[CH_3(CH_2)_3]_3Sn$—H (TBSI);

5 phr of ZnO;

30 phr of carbon black MT.

The mixing was carried out by rolls. The blend composition and its Mooney viscosity (standard ASTM D1646-82) are reported in Table 1.

The curing curve was determined on the composition thus obtained by Oscillating Disk Rheometer (ODR) by Monsanto (100S Model), according to the standard ASTM D2084-81, by operating at 177° C. with an oscillation width of 3°. From such curve were calculated the parameters reported in Table 1 relating to the crosslinking rate and degree: $M_L$ (minimum torque); $M_H$ (maximum torque); $M_H$–$M_L$ (final crosslinking degree); $(M_H$–$M_L)/M_H$ (normalized value of the crosslinking degree); $t_sx$ (x=2, 10, 50) (time required for an increase of the torque of x lb·inc above $M_L$); $t'x$ (x=50, 90) (time required for an increase of x% of the torque); $V_{max}$ (maximum crosslinking rate).

EXAMPLE 2 (COMPARATIVE)

Example 1 was repeated with the same blend but free from TBSI. The composition and the data concerning the ODR curve are reported in Table 1.

Comparing the data obtained in Examples 1 and 2, it can be noticed how the presence of TBSI in the curable composition considerably increases the curing rate, with a good final crosslinking degree.

EXAMPLE 3

Example 1 was repeated by using an amount of 0.536 phr of triethyl-tin-hydride instead of TBSI. The results are reported in Table 1.

EXAMPLE 4

Example 1 was repeated by using an amount of 0.536 phr of triethyl-silyl-hydride instead of TBSI. The results are reported in Table 1.

TABLE I

| EXAMPLE | | 1 | 2(*) | 3 | 4 |
|---|---|---|---|---|---|
| Blend composition | | | | | |
| Polymer | (g) | 100 | 100 | 100 | 100 |
| Luperco® 101 XL | (phr) | 3 | 3 | 3 | 3 |
| TAIC | (") | 4 | 4 | 4 | 4 |
| TBSI | (") | 0.536 | — | 0.536++ | 0.5361+++ |
| ZnO | (") | 5 | 5 | 5 | 30 |
| Carbon black MT | (") | 30 | 30 | 30 | |
| Mooney Viscosity | (lb · in) | 85 | 87 | 85 | 90 |
| (ASTM 1646-82) | | | | | |
| Curing curve ODR | | | | | |
| (177° C., width = 3° ASTM D2084-81) | | | | | |
| $M_L$ | (lb · in) | 21.3 | 20.2 | 21.2 | 24 |
| $M_H$ | (") | 79.1 | 80.1 | 79 | 81 |
| $M_H-M_L$ | (") | 57.8 | 59.9 | 57 | 58.5 |
| $(M_H-M_L)/M_H$ | | 0.73 | 0.75 | 0.73 | 0.70 |
| $t_s2$ | (sec) | 63 | 75 | 64 | 74 |
| $t_s10$ | (") | 87 | 99 | 88 | 95 |
| $t_s50$ | (") | 288 | 318 | 295 | 310 |
| t'50 | (") | 120 | 144 | 123 | 140 |
| t'90 | (") | 336 | 405 | 340 | 398 |
| $V_{max}$ | (lb · in/sec) | 0.62 | 0.53 | 0.63 | 0.53 |

(*)comparative
++triethyl-tin-hydride
+++triethyl-silyl hydride

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Curable fluoroelastomeric composition, comprising:
   (a) a fluoroelastomer containing bromine;
   (b) an organic peroxide, in amounts between 0.1 and 10% by weight with respect to the fluoroelastomer;
   (c) a metallorganic hydride having the formula:

$$(R_wH_{3-w}M)_z-M-(H)_x \qquad (I)$$

wherein M is selected from Sn, Si, Ge, Pb; x is an integer from 1 to 3; y, z are zero or integers from 1 to 3, with the proviso y+z=4-x; w is an integer from 1 to 3; the R groups, equal to or different from each other, are selected from: alkyls $C_1-C_4$, aryls $C_6-C_{12}$, arylalkyls and alkylaryls $C_7-C_{14}$, optionally containing nitrile and/or hydroxyl groups; in amounts between 0.2 and 10% by weight with respect to the fluoroelastomer.

2. Composition according to claim 1, wherein the hydride of formula (I) has x=1 and w=3.

3. Composition according to claim 2, wherein the hydride is selected from: tri(n-butyl)-tin-hydride, tri(ethyl)silyl-hydride, di(trimethylsilyl)-silylmethyl-hydride, tri (trimethylsilyl)-silylhydride, or mixtures thereof.

4. Composition according to claim 1, wherein the fluoroelastomer contains bromine in amounts between 0.001 and 5% by weight with respect to the total weight of the polymer, the bromine atoms being present along the chain and/or in terminal position.

5. Composition according to claim 4, wherein the bromine atoms along the chain derive from a fluorinated comonomer containing bromine.

6. Composition according to claim 4, wherein the bromine atoms in terminal position derive from a brominated chain transfer agent introduced in the reaction medium during the preparation of the polymer.

7. Composition according to claim 1, wherein the fluoroelastomer has a basic monomeric structure comprising from 20 to 85% by moles of VDF and/or TFE, copolymerized with at least another fluorinated ethylenically unsaturated monomer.

8. Composition according to claim 7, wherein the fluorinated ethylenically unsaturated monomer is selected from: perfluoroolefins $C_3-C_8$; fluoroolefins $C_2-C_8$ containing hydrogen and/or chlorine; (per)fluoroalkylvinylethers (PAVE) $CF_2=CFOR_f$, wherein $R_f$ is a (per)fluoroalkyl $C_1-C_6$; perfluoro-oxyalkylvinylethers $CF_2=CFOX$, wherein X is a perfluorooxyalkyl $C_1-C_{12}$ having at least one ether group.

9. Composition according to claim 7, wherein the fluoroelastomer comprises moreover units deriving from non fluorinated ethylenically unsaturated monomers.

10. Composition according to claim 1, further comprising a polyunsaturated compound acting as a curing co-agent.

11. Composition according to claim 10, wherein the polyunsaturated compound is present in amounts between 0.1 and 10% by weight with respect to the fluoroelastomer.

12. Composition according to claim 10, wherein the curing co-agent is selected from: triallyl-cyanurate (TAC), triallyl-isocyanurate (TAIC), triallyl-trimellitate, tris (diallylamino)-s-triazine, triallyl-phosphite, N,N-diallyl-acrylamide, hexaallyl-phosphoramide, N,N'-m-phenylene-bismaleimide, diallyl-phthalate, tri(5-norbornene-2-methylene)-cyanurate.

13. Process for curing a composition based on a fluoroelastomer containing bromine, which comprises adding to the composition an organic peroxide and an hydride of formula (I) as defined in claim 1, and subsequently heating the composition at a temperature such as to cause the peroxide decomposition.

* * * * *